Patented June 8, 1943

2,321,496

UNITED STATES PATENT OFFICE 2,321,496

POLYAMINO PETROLEUM SULPHONATES AND THEIR DEHYDRATES

Leo Liberthson, New York, N. Y., assignor to L. Sonneborn Sons, Inc., a corporation of Delaware No Drawing. Application July 11, 1940, Serial No. 344,918

7 Claims. (Cl. 260—501)

This invention relates to new and useful petroleum sulphonate products.

In the acid refining of lubricating oil distillates, the crude stocks are usually treated with concentrated sulphuric acid and preferably fuming sulphuric acid in the well-known manner to yield a two layer system comprising an oil layer and an acid sludge layer. The acid treatment, being carried out under sulphonating conditions of acid amount and temperature, results in the formation of so-called petroleum sulphonic acids, that are generally of two types; one, the so-called mahogany petroleum sulphonic acids, which, due to their oil soluble character, are found in the oil layer, and two, the green petroleum sulphonic acids, primarily of a water soluble nature, found dissolved in the sludge. These sulphonic acids are recovered after suitable extraction and purification from the respective layers, either as such or in the form of their salts, i. e., petroleum sulphonates, in accordance with well-known practices.

In accordance with the invention an alkylene or poly-alkylene polyamine having at least once the grouping

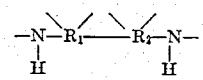

in which $R_1$ and $R_2$ may be any alkylene or aralkylene radical, is reacted with a suitable petroleum sulphonic acid. The reaction is essentially one of neutralization of the polyamino base with the sulphonic acid. The reagents are preferably used in amounts sufficient to provide one sulphonic acid group for each of at least two of the amino groups present in the polyamine. In most cases, however, the preferred practice is to provide for each amino group present in the polyamine at least one sulphonic acid group. It will generally suffice to establish the molecular weight of the particular petroleum sulphonic acid used in the reaction, such as by a sulphur determination, and to react the polyamine and the sulphonic acid in substantially stoichiometrical proportions.

The alkylene or polyalkylene polyamines that may be used in accordance with the invention are represented by the following general formula:

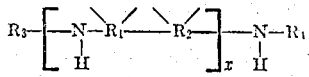

in which $R_1$ and $R_2$ are any alkylene or aralkylene radical and $R_3$ and $R_4$ any hydrogen, alkyl, aryl or aralkyl radical and in which $x$, being at least one in number, designates the number of $-NH-R_1-R_2-$ members in the polyamino chain. Suitable alkylene or polyalkylene polyamines are, for instance, ethylene diamine, diethylene triamine, triethylene tetramine, tetraethylene pentamine, or any alkyl, aryl, or aralkyl derivatives thereof.

In the practical application of my invention the polyamine and the petroleum sulphonic acid are brought into intimate contact with one another so as to effect a reaction between the same. In most cases it will suffice to intimately mix the reagents without the aid of solvents and the reaction will proceed at normal temperatures. If necessary slightly raised temperatures may be resorted to. In many cases, however, the reaction between the reagents will proceed more satisfactorily if one or the other of them or both are present in the form of a suitable solution in a given solvent, which solvent is preferably such that the resulting sulphonate product is substantially insoluble therein. The neutralization reaction may thus, for instance, be obtained with the polyamine added to the petroleum sulphonic acid while the latter is in suitable solution. If a mahogany petroleum sulphonic acid, for instance, is used, a solvent, such as xylol, may serve this purpose, whereas if a green petroleum sulphonic acid is used, water or alcohol are satisfactory. Alternatively, when using mahogany petroleum sulphonic acids, it is preferred to use a suitable oil as a solvent for the sulphonic acid. Such procedure offers the particular advantage that it is possible to use directly the oil layer obtained in the acid refining of a lubricating oil distillate and containing the mahogany sulphonic acids in solution, thus substantially eliminating the necessity for extraction or isolation of these acids.

When using within the preferred embodiment of my invention an oil, containing mahogany sulphonic acid, the same is preferably substantially freed from inorganic acidity by air blowing and settling, and thereafter admixed with the polyamine. The mahogany sulphonic acid dissolved in the oil will react with the polyamine to form the polyamino sulphonate.

When, in accordance with the preferred practice of my invention, use is made of a solution of mahogany sulphonic acid in oil, the addition of the polyamine may be accomplished in different ways. The same may be added to the solution of the sulphonic acid in oil as such, i. e., without prior solution in a suitable solvent, or in the form of a solution in a solvent such as water, alcohol or the like. If the polyamine is added as such, it is preferred to effect the addition in excess of stoichiometrical amounts as this will facilitate the precipitation of the reaction product with the sulphonic acid which otherwise would have to be accomplished with the aid of centrifugal separation. If, on the other hand, the polyamine is added in solution, it is not necessary as a rule to add in excess of stoichiometrical amounts for the accomplishment of a satisfactory and rapid precipitation of the sulphonate product. When the polyamine is added in excess of stoichiometrical amounts, this excess is as a rule carried to a considerable extent into the settled or precipitated polyamino petroleum sulphonate from which it may be recovered if desired by suitable extraction with for instance alcohol or water.

The polyamino sulphonates obtained in accordance with the invention possess preferably at least once the grouping

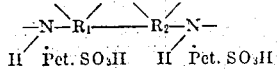

in which $R_1$ and $R_2$ may be any alkylene or aralkylene radical, and $Pet.SO_3H$ a petroleum sulphonic acid and constitute preferably polysulphonates of the general formula

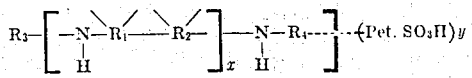

in which $R_1$ and $R_2$ are any alkylene or aralkylene radical and $R_3$ and $R_4$ any hydrogen, alkyl, aryl or aralkyl radical in which $x$, being at least one in number, designates the number of

members in the polyamino sulphonate chain and in which $y$ designates the number of petroleum sulphonic acid groups present in the polyamine. It is preferred to substantially neutralize the polyamine in which case $y$ equals $x+1$, i. e., there is at least one $Pet.SO_3H$ group present for each reactive NH in the polyamino sulphonate molecule.

The polyamino sulphonates in accordance with the invention are substantially insoluble in aqueous or alcoholic media as well as in petroleum hydrocarbons. They are substantially soluble in aromatic solvents, such as benzol and its homologues, halogenated hydrocarbons, such as chloroform, and in higher aliphatic esters, such as amyl acetate. If the reaction between the polyamine and the sulphonic acid is effected in the presence of a solvent in which the resulting polyamino sulphonate is substantially insoluble, which constitutes the preferred practice in accordance with my invention, the polyamino sulphonate is precipitated and the precipitate may be recovered by decantation, followed if necessary or desired, by a suitable washing of the precipitate.

In making the polyamino green sulphonates it is preferable to first isolate the green acids from the acid sludge. This may be done in a conventional manner by neutralizing the acid sludge, extracting the green sulphonates with alcohol, distilling off the alcohol and then regenerating the green acids by the exact amount of acid necessary, settling out the salts, removing the layer of green acids and then reacting the latter with the desired amount of polyamine and preferably with stoichiometric amounts.

As the number of amino groups in the polyamino sulphonate increases, solvent solutions of the compounds increase in viscosity. Thus a 30% xylol solution of the reaction products of diethylene triamine and green sulphonic acid has a viscosity of about 35 @ 210° F. while a xylol solution of the same concentration of the reaction products of the green acids and triethylene tetramine has a viscosity of 48 @ 210° F., while the viscosity of a solution of the same solution of the tetraethylene pentamine green sulphonate has a viscosity of about 58 @ 210° F.

Within the broad purview of my invention and as a further embodiment thereof a dehydration of the polyamino petroleum sulphonates may be accomplished, yielding valuable products of a resinous character. For this purpose the polyamino petroleum sulphonates are heated to dehydrating temperatures, i. e., temperatures sufficiently high to split off water from their molecular structure. In most cases it is preferred to heat at a temperature above approximately 250° F. and below the temperature at which decomposition of the polyamino petroleum sulphonate occurs, i. e., the temperature at which evolution of ammonia becomes noticeable. In general temperatures between 250° F. and 320° F. suffice. The heating is preferably carried out under dehydrating conditions, i. e., for a period of time sufficient to yield at a given dehydration temperature or temperature range a substantially constant weight, indicating that substantially all of the intra molecular water desired to be removed has been driven off. The period of heating is to some extent dependent upon the number of sulphonic groups present in the sulphonate, as these determine the amount of water to be removed from the product; the heating may thus require from 1 to 4 hours or more. Analyses of the dehydrated polyamino petroleum sulphonates, in accordance with the invention, for sulphur and nitrogen, agreed substantially with the theoretical calculated sulphur and nitrogen content. Determinations of the water produced in the dehydration reactions substantially agreed with the theoretically calculated amount of water produced in intra molecular dehydrations from each amino petroleum sulphonate group present.

Alternatively, the intra molecular dehydration may be accomplished by dissolving the polyamino petroleum sulphonate in a suitable solvent having a relatively high boiling point and to reflux, preferably with a water trap arrangement, the sulphonate solution until the dehydration reaction is complete. The boiling point of such solvent is preferably in excess of 250° F. and below the decomposition temperature of the polyamino petroleum sulphonate, i. e., the temperature at which evolution of ammonia occurs. A suitable solvent for such purpose is, for instance, xylol having a boiling point of approximately 285° F. When proceeding in this manner, the temperature at which the dehydration reaction takes place is as a general rule lower than is the case when dry-heating the product. It is preferred to select such solvent for the solvent-dehydration procedure as will not appreciably dissolve the dehydrated product and from which such product will precipitate as it is formed. Such solvent is, for instance, kerosene of an initial boiling point of approximately 300° F. and an end point of approximately 450° F.

When a polyamino mahogany sulphonate product is obtained by precipitation from a mahogany acid containing oil, as previously described, the precipitate will as a rule contain approximately its own weight of occluded oil. If desired, this occluded oil may be removed by suitable extraction from the polyamino sulphonate before the dehydration is carried out. In many cases, however, it is of advantage to subject the polyamino sulphonate product together with its content of occluded oil to the dehydration reaction. The then resulting product, though in most respects substantially identical with the product obtained by the dehydration of the sulphonate in the absence of occluded oil, particularly with regard to appearance, film forming tendency, etc., is yet in other respects different. The same possesses, for instance, a modified, usually lower melting point and constitutes a much more plastic and softer product than is otherwise the case.

The dehydrated polyamino sulphonates in accordance with the invention have highly desirable characteristics and properties.

The mahogany sulphonic acid derived products, while fused, are capable of being converted to transparent sheets which, upon cooling, resemble dry varnish films; they are thermoplastic and capable of being drawn out into long threads and possess definite fusing temperatures and sharp cooling curves; thus, for example, the sulphonamide obtained by dehydrating a diethylene triamine mahogany sulphonate shows a fusing point of approximately 160 to 170° F., while the triethylene tetramine mahogany sulphonamide and the tetraethylene pentamine sulphonamide possess fusing points of approximately 185° F. to 190° F. and 220° F. to 230° F. respectively (A. S. T. M. ball and ring method). The polyamino mahogany sulphonamides when added to other resins or products with which they are compatible as, for example, rosin, estergum, cumar, and certain modified phenolic resins will impart plasticity thereto.

In contrast to the plastic masses obtained from petroleum mahogany polysulphonamides, the petroleum green polysulphonamides are dark, brittle solids, soluble in coal tar hydrocarbons, halogenated hydrocarbons and higher esters. The solutions obtained yield black coatings similar to asphalt but the films lack elasticity. The petroleum green polysulphonamides are, however, compatible with the petroleum mahogany polysulphonamides so that the latter may serve as plasticizers for the former.

Where in the specification and claims reference is made to the term "petroleum sulphonic acid" or where an expression of similar import is used, it is intended to designate thereby generically any one or more or mixture of sulphonic acids derived from the acid refining of a lubricating oil distillate under sulphonating conditions.

The foregoing description is for purposes of illustration and not of limitation, and the same is not to be limited except by the appended claims in which I have endeavored to claim broadly all inherent novelty.

I claim:

1. A petroleum sulphonate product which essentially comprises a substantially neutral petroleum sulphonic acid salt of a polyalkylene polyamine.

2. A petroleum sulphonate product which essentially comprises a substantially neutral petroleum mahogany sulphonic acid salt of a polyalkylene polyamine.

3. A petroleum sulphonate product which essentially comprises a substantially neutral petroleum green sulphonic acid salt of a polyalkylene polyamine.

4. Method for producing a substantially neutral petroleum sulphonic acid salt of a polyalkylene polyamine which comprises adding, in neutralizing amounts, such polyalkylene polyamine to the mahogany sulphonic acid containing oil layer of a sulphuric acid refined petroleum hydrocarbon stock and separating the precipitated polyalkylene polyamino mahogany petroleum sulphonate formed.

5. A petroleum sulphonate product which essentially comprises a substantially neutral petroleum sulphonic acid salt of diethylenetriamine.

6. A petroleum sulphonate product which essentially comprises a substantially neutral petroleum sulphonic acid salt of triethylene tetramine.

7. A petroleum sulphonate product which essentially comprises a substantially neutral petroleum sulphonic acid salt of tetraethylene pentamine.

LEO LIBERTHSON.